(12) United States Patent
Kaneko et al.

(10) Patent No.: US 8,319,998 B2
(45) Date of Patent: Nov. 27, 2012

(54) BILLING SYSTEM CAPABLE OF BEING CONNECTED TO AN OUTPUT APPARATUS HAVING PRINTING FUNCTION AND COPY FUNCTION VIA A NETWORK SERVER APPARATUS CAPABLE OF BEING CONNECTED TO AN OUTPUT APPARATUS HAVING PRINTING FUNCTION AND COPY FUNCTION VIA A NETWORK AND METHOD OF BILLING BY SYSTEM CAPABLE OF BEING CONNECTED TO AN OUTPUT APPARATUS HAVING PRINTING FUNCTION AND COPY FUNCTION VIA A NETWORK

(75) Inventors: Takashi Kaneko, Kanagawa (JP); Hayato Sakae, Tokyo (JP); Naoki Shimamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 909 days.

(21) Appl. No.: 12/366,136

(22) Filed: Feb. 5, 2009

(65) Prior Publication Data

US 2009/0207440 A1 Aug. 20, 2009

(30) Foreign Application Priority Data

Feb. 14, 2008 (JP) ................................. 2008-033447

(51) Int. Cl.
 *G06F 3/12* (2006.01)

(52) U.S. Cl. ...................................................... 358/1.15
(58) Field of Classification Search .................. None
 See application file for complete search history.

(56) References Cited

U.S. PATENT DOCUMENTS

2004/0186801 A1* 9/2004 Morita ............................. 705/32
2004/0223778 A1* 11/2004 Zwiefelhofer .................. 399/79

FOREIGN PATENT DOCUMENTS

JP 2003-345558 12/2003

* cited by examiner

*Primary Examiner* — Benny Q Tieu
*Assistant Examiner* — Jeremiah Bryar
(74) *Attorney, Agent, or Firm* — Oblon, Spivak, McClelland, Maier & Neustadt, L.L.P.

(57) ABSTRACT

A disclosed billing system includes a client apparatus, a multi-functional peripheral, a server apparatus and a billing apparatus. A communication unit of the billing apparatus sequentially transmits first account balance information read from a storage medium to the server apparatus; receives from the server apparatus a copy permission signal which is then transmitted to the multi-functional peripheral; receives from the multi-functional peripheral a copy-output signal regarding a copy output having been performed on the multi-functional peripheral, the copy-output signal being then transmitted to the server apparatus; and receives copy billing information transmitted from the server apparatus according to the transmitted copy-output signal.

6 Claims, 7 Drawing Sheets

DOCUMENT ID  A000

USER ID  AAA

[NEXT DOCUMENT]  [OK]

FIG.5B

☒  DOCUMENT 1   ¥ 50
☒  DOCUMENT 2   ¥ 300
☐  DOCUMENT 3   ¥ 200

BILLING SYSTEM CAPABLE OF BEING CONNECTED TO AN OUTPUT APPARATUS HAVING PRINTING FUNCTION AND COPY FUNCTION VIA A NETWORK SERVER APPARATUS CAPABLE OF BEING CONNECTED TO AN OUTPUT APPARATUS HAVING PRINTING FUNCTION AND COPY FUNCTION VIA A NETWORK AND METHOD OF BILLING BY SYSTEM CAPABLE OF BEING CONNECTED TO AN OUTPUT APPARATUS HAVING PRINTING FUNCTION AND COPY FUNCTION VIA A NETWORK

BACKGROUND OF THE INVENTION

1. Field of the Invention

The present invention is directed to a billing system, a server apparatus and a billing apparatus, in particular directed to a billing system for billing a user for a print output or a copy output from a multi-functional peripheral performed in response to an instruction from the user.

2. Description of the Related Art

In recent years, with advancement of office automation equipment, such as copiers and printers, or network development, document printing is available in a wide variety of environments. It is possible that, for example, a user uses their client apparatus to accumulate print data in a server apparatus connected to the client apparatus via a network, and prints the print data on a printer remotely positioned from the client apparatus.

In a printing billing system discussed in Patent Document 1, a client apparatus, a printer, a print server apparatus, and a printing billing apparatus are connected to each other via a network, and the user operates the client apparatus to preliminarily accumulate print jobs in the print server apparatus. Subsequently, to make a print request, the user issues an instruction through a display screen of the printing billing apparatus. In response to the instruction, the print jobs of the user accumulated in the print server apparatus are transmitted to the printing billing apparatus and displayed in a list on a screen of the printing billing apparatus. Then, the printing billing apparatus executes a print job selected by the user from the list, and charges the user for the service based on the print log.

[Patent Document 1] Japanese Laid-open Patent Application Publication No. 2003-345558

However, according to the printing billing system disclosed in Patent Document 1, a target for printing and billing is print jobs by a printer, and hence the conventional printing billing system does not support a so-called multi-functional peripheral providing a copy function in addition to a printing function.

SUMMARY OF THE INVENTION

In order to solve the above-mentioned problem, the present invention aims at providing a billing system capable of appropriately charging the user based on the result when printing or copying is done using a multi-functional peripheral (MFP) having a printing function and a copy function.

One embodiment of the present invention may be a billing system including a client apparatus, a server apparatus, a billing apparatus and a multi-functional peripheral which are connected to one another via a network. The server apparatus includes a storage unit configured to store a printing document directed by the client apparatus; an input unit configured to receive a print instruction and a copy instruction; and an information processing unit configured to, if the print instruction is received, cause the multi-functional peripheral to perform a print output of the printing document based on the print instruction, and generate print-billing information for the print output based on a print-output signal related to the print output and transmitted from the multi-functional peripheral and, if the copy instruction is received, transmit a copy permission signal to the multi-functional peripheral based on the copy instruction so as to cause the multi-functional peripheral to perform a copy output, and generate copy-billing information for the copy output based on a copy-output signal relating to the copy output and transmitted from the multi-functional peripheral. The billing apparatus includes an input unit configured to read first account balance information of a billing account stored in a storage medium, the billing account being an account from which fee payment for an output performed by the multi-functional peripheral is made; a communication unit configured to communicate with the server apparatus and the multi-functional peripheral; and a billing processing unit configured to update the first account balance information to second account balance information based on the print-billing information and the copy-billing information transmitted from the server apparatus. In the case of the print output, the communication unit sequentially transmits the first account balance information to the server apparatus, and receives the print-billing information transmitted from the server apparatus according to the print-output signal. In the case of the copy output, the communication unit sequentially transmits the first account balance information to the server apparatus, receives from the server apparatus the copy permission signal which is then transmitted to the multi-functional peripheral, receives from the multi-functional peripheral the copy-output signal which is then transmitted to the server apparatus, and receives the copy-billing information transmitted from the server apparatus according to the copy-output signal.

Another embodiment of the present invention may be a server apparatus capable of being connected to a client apparatus and a multi-functional peripheral via a network. The server apparatus includes a storage unit configured to store a printing document directed by the client apparatus; an input unit configured to receive a print instruction and a copy instruction; and an information processing unit configured to, if the print instruction is received, cause the multi-functional peripheral to perform a print output of the printing document based on the print instruction, and generate print-billing information for the print output based on a print-output signal related to the print output and transmitted from the multi-functional peripheral and, if the copy instruction is received, transmit a copy permission signal to the multi-functional peripheral based on the copy instruction so as to cause the multi-functional peripheral to perform a copy output, and generate copy-billing information for the copy output based on a copy-output signal relating to the copy output and transmitted from the multi-functional peripheral.

Another embodiment of the present invention may be a billing apparatus capable of being connected to a server apparatus and a multi-functional peripheral via a network. The billing apparatus includes an input unit configured to read first account balance information of a billing account stored in a storage medium, the billing account being an account from which fee payment for an output performed by the multi-functional peripheral is made; a communication unit configured to communicate with the server apparatus and the multi-functional peripheral; a converting unit configured to convert a parallel signal received from the server apparatus into a serial signal and convert a serial signal received from the multi-functional peripheral into a parallel signal; and a billing processing unit configured to update the first account balance information to second account balance information based on print-billing information and copy-billing information transmitted from the server apparatus, the print-billing information and the copy-billing information corresponding to a print output and a copy output, respectively, performed by the multi-functional peripheral. In the case of the print output, the communication unit sequentially transmits the first account balance information to the server apparatus, and receives the print-billing information transmitted from the server apparatus. In the case of the copy output, sequentially, the communication unit transmits the first account balance information to the server apparatus, and receives a copy permission signal transmitted from the server apparatus. The converting unit then converts the received copy permission signal from a parallel signal into a serial signal. The communication unit transmits the parallel-to-serial converted signal to the multi-functional peripheral, and receives a copy-output signal related to the copy output and transmitted from the multi-functional peripheral. The converting unit then converts the received copy-output signal from a serial signal into a parallel signal. The communication unit transmits the serial-to-parallel converted signal to the server apparatus and receives the copy-billing information transmitted from the server apparatus according to the transmitted copy output.

DETAILED DESCRIPTION OF THE PREFERRED EMBODIMENTS

An embodiment that describes the best mode for carrying out the present invention is explained next with reference to the drawings.

Figure 1:
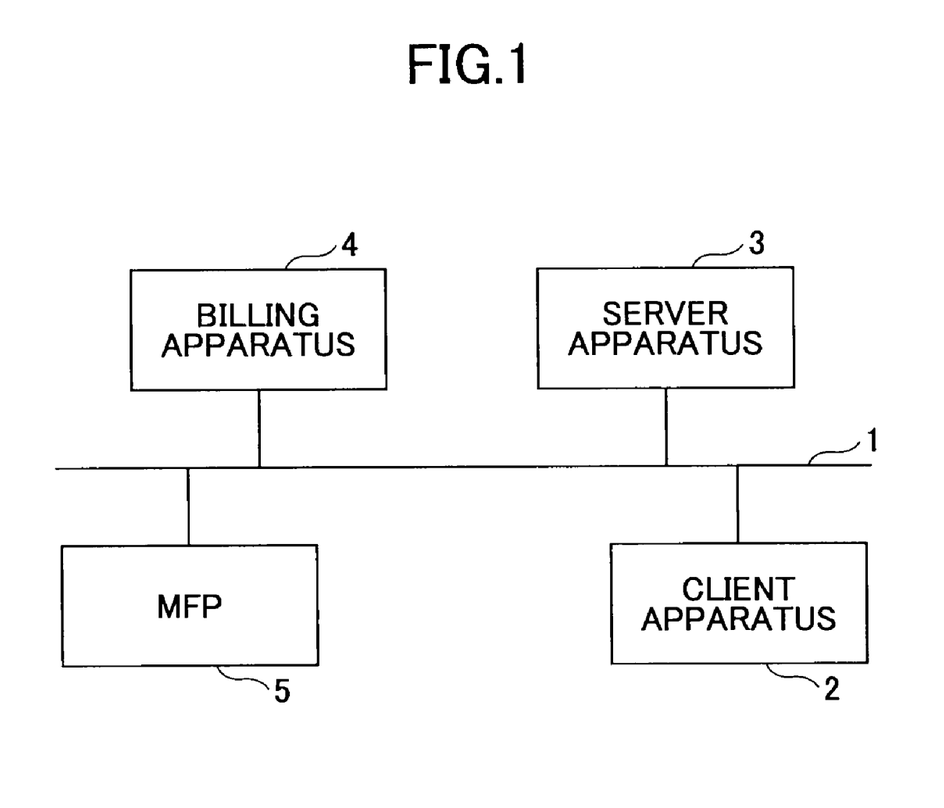
FIG. 1 illustrates an overall structure of a billing system according to one embodiment of the present invention.

FIG. 1 illustrates an overall structure of a billing system according to one embodiment of the present invention. Reference numeral 1 denotes a network; reference numeral 2, a client apparatus; reference numeral 3, a server apparatus; reference numeral 4, a billing apparatus; and reference numeral 5, a multi-functional peripheral.

In the billing system, the client apparatus 2, the server apparatus 3, the billing apparatus 4 and the multi-functional peripheral 5 are connected to each other via the network 1 so that they can communicate with one another to transfer information and directions. Print data instructed from the client apparatus 2 to be printed is first accumulated in the server apparatus 3, and the user is able to obtain a print output from the multi-functional peripheral 5 by paying a fee for the print job through the billing apparatus 4. On the other hand, when the user wants to make a copy, the user is able to use the copy function of the multi-functional peripheral 5 in a similar manner by paying a fee for the copy job through the billing apparatus 4. It should be noted that, in general, multiple client apparatuses 2 are connected to the network 1; however, for ease of explanation, the present embodiment is described assuming only one client apparatus 2 is connected.

The multi-functional peripheral 5 has a printing function of a commonly-used printer and a copy function of a commonly-used copy machine. In the following description of the present embodiment, printing and copying are clearly differentiated using the term "printing" or similar and "copying" or similar, respectively. On the other hand, the term "reproducing" or similar is used to refer to both printing and copying.

Figure 2:
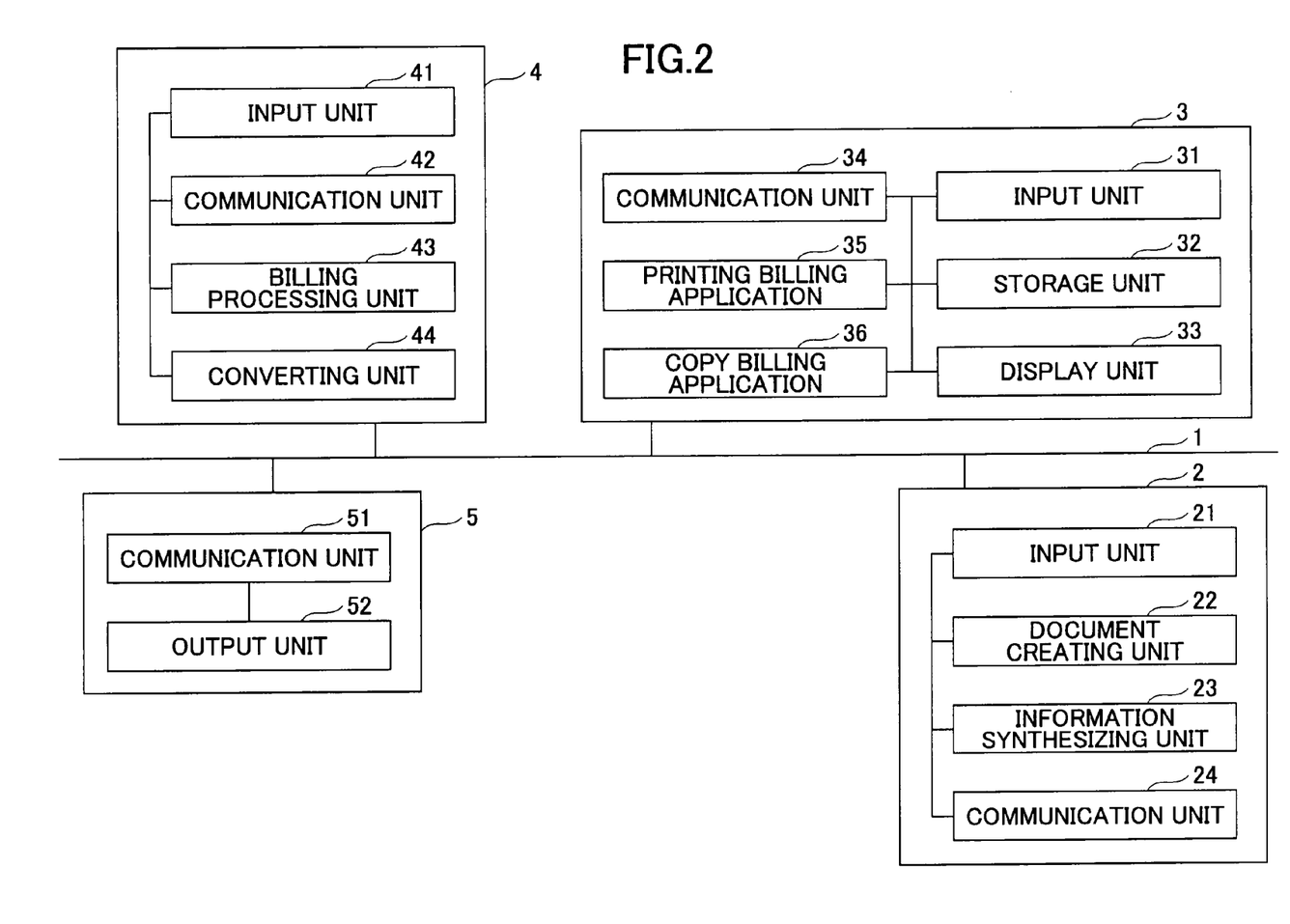
FIG. 2 is a block diagram showing relevant parts of the billing system according to the present embodiment.

FIG. 2 is a block diagram showing relevant parts of the billing system according to the present embodiment.

In FIG. 2, the client apparatus 2 is an information processor, such as a personal computer, and includes an input unit 21, a document creating unit 22, an information synthesizing unit 23 and a communication unit 24. The user inputs his/her user information using the input unit 21 of the client apparatus 2, and when user authentication is successful, the user is able to use the billing system. The user specifies, through the client apparatus 2, information he/she desires to be printed, and transmits the specification to the server apparatus 3.

The input unit 21 receives instructions and information from the user. Specifically, the input unit 21 includes an IC card reader, a keyboard and a mouse, and is configured to read information on an IC card of the user (e.g. a user ID, and the remaining balance on the card). The input unit 21 may be designed to receive a user ID, a password, a direction and the like through the keyboard and/or the mouse. The document creating unit 22 creates a document for printing. The document may be created using document creating software or the like installed on the client apparatus 2, may be loaded from an external recording medium, such as an USB memory, or may be retrieved from an external apparatus via a network. The term "document" herein is a generic term used to refer to information desired to be printed and shall include not only text information but also drawings and other types of information. The information synthesizing unit 23 associates the user ID input through the input unit 21 with the document created by the document creating unit 22, and creates a user-ID information attached document. The communication unit 24 is designed to transfer instructions and information to/from the server apparatus 3 and the multi-functional peripheral 5, and the user-ID information attached document created by the information synthesizing unit 23 is transmitted to the server apparatus 3 in response to an instruction of the user. Information synthesis performed by the information synthesizing unit 23 and communication performed by the communication unit 24 can be implemented by software.

The server apparatus 3 includes an input unit 31, a storage unit 32, a display unit 33, a communication unit 34, a printing billing application 35 and a copy billing application 36. When the user uses the printing function, the server apparatus 3 receives the user-ID information attached document from the client apparatus 2. The server apparatus 3 appends a document ID unique to the received document and also transmits the document ID to the client apparatus 2. If receiving multiple documents since the user instructs printing of the multiple documents, the server apparatus 3 appends a unique document ID to each document, and transmits the document IDs to the client apparatus 2. Then, when the server apparatus 3 receives an instruction of printing from the user, the server apparatus 3 displays on the display unit 33, the document ID(s) together with a fee(s) to print the document(s). Then, if the user actually issues a print instruction through the input unit 31, the server apparatus 3 causes the multi-functional peripheral 5 to perform printing, and performs billing control using the printing billing application 36. On the other hand, when the user uses the copy function, the server apparatus 3 receives necessary information from the multi-functional peripheral 5 and performs billing control based on the information using the copy billing application 37.

The input unit 31 includes a touch panel and a keyboard. Using the input unit 31, the user is able to issue instructions of reproducing a document and displaying a fee to the printing billing application 35 or the copy billing application 36. The input unit 31 may be designed to receive a print instruction signal and a copy instruction signal transmitted from an external apparatus. The storage unit 32 includes a hard disk and the like, and stores the user-ID information attached document information transmitted from the client apparatus 2. The display unit 33 displays necessary information such as a name of a document to be reproduced and its fee information. In the present embodiment, the display unit 33 is a touch panel, and the following description is given assuming that the display unit 33 also serves as the input unit 31. The communication unit 34 is designed to transfer information and directions to/from the client apparatus 2, the billing apparatus 4 and the multi-functional peripherals 5.

The printing billing application 35 and the copy billing application 36 perform information processes, mainly billing processes, for print and copy jobs carried out using the billing system. Specifically, the user makes a selection on a copy/printing selection UI (User Interface) of the input unit 31 to indicate execution of, for example, printing, and requests a print job by inputting the user ID and a document ID. In response to the request, the printing billing application 35 checks the input user ID and document ID against the user ID and document ID appended to each document stored in the storage unit 32. Then, the printing billing application 35 analyzes the document whose IDs are matched with the input IDs, and displays a fee for printing the document on the display unit 33. The document analysis includes analyzing attribute information of the document for which printing is requested, and referring to a fees data table stored in the storage unit 32 and determining the fee according to, for example, whether the document is in color or monochrome, the size of the document, and the number of pages. The fees data table may be stored in the billing apparatus 4 to be described below, and the server apparatus 3 may obtain information of the fees data table from the billing apparatus 4. The calculated fee for the print job is displayed on the display unit 33 together with the document name or the document ID. In the case where the user issues a print instruction of multiple documents, the printing billing application 35 performs the ID information checking, the document analysis and the fee calculation with respect to each document, and the results are displayed in a list on the display unit 33.

On the other hand, when the user makes a selection on the copy/printing selection UI of the input unit 31 to indicate execution of copying, the copy billing application 36 is launched. Based on the information on the remaining balance on the IC card transmitted from the billing apparatus 4, the copy billing application 36 outputs an instruction (signal) indicating copy permission to the multi-functional peripheral 5. The information processes performed by the printing billing application 35 and the copy billing application 36 can be implemented by software.

The billing apparatus 4 includes an input unit 41, a communication unit 42, a billing processing unit 43, and a converting unit 44. The input unit 41 includes an IC card reader. The user causes the IC card reader to read the IC card, whereby the billing apparatus 4 is able to obtain the user ID, the remaining balance information on the card and the like. The communication unit 42 transmits to the server apparatus 3 the ID information and the remaining balance information of the IC card obtained from the input unit 41 while communicating with the printing billing application 35 and the copy billing application 36 of the server apparatus 3 so as to receive billing information on a reproduction service used by the user on the server apparatus 3. The billing processing unit 43 performs a billing process based on the billing information received from the server apparatus 3. Specifically, the billing processing unit 43 withdraws a fee for the used service from a pre-charged amount on the IC card. Instead of withdrawing a fee, a point system may be employed, or fee information corresponding to used services may be accumulated on the IC card and the payment may be settled afterward. The billing apparatus 4 also functions as a repeater at the time when the server apparatus 3 transmits a copy permission signal to the multi-functional peripheral 5 and when the multi-functional peripheral 5 transmits to the server apparatus 3 information regarding copy operations (e.g. information of a sheet feeding counter and a sheet ejection counter of the multi-functional peripheral 5). The function as a repeater is provided for bidirectionally converting between serial signals that are input/output signals of the multi-functional peripheral 5 and parallel signals that are input/output signals of the server apparatus 3. The converting unit 44 of the billing apparatus 4 assumes the serial/parallel conversion so as to bidirectionally transfer signals between the multi-functional peripheral 5 and the server apparatus 3.

The multi-functional peripheral 5 in the present embodiment is a commonly-used multi-functional peripheral having a copy function, a printing function and the like. The multi-functional peripheral 5 includes a communication unit 51 and an output unit 52. When the user uses a printing service, the multi-functional peripheral 5 receives document data to be printed from the server apparatus 3 through the communication unit 51 to produce a print output. On the other hand, when the user uses a copy service, the multi-functional peripheral 5 transfers necessary information to/from the server apparatus 3 via the billing apparatus 4 to produce a copy output. The printing processes and copy processes can be achieved by a known method, and the explanation is therefore omitted. In addition, the billing system is designed in such a manner that, when the multi-functional peripheral 5 carries out a copy service or a printing service, the server apparatus 3 and the billing apparatus 4 are able to obtain information about the print output or the copy output via the communication unit 51. Based on the obtained information, the server apparatus 3 generates billing information as described above and transmits the billing information to the billing apparatus 4, which then performs the billing process.

Figure 3:
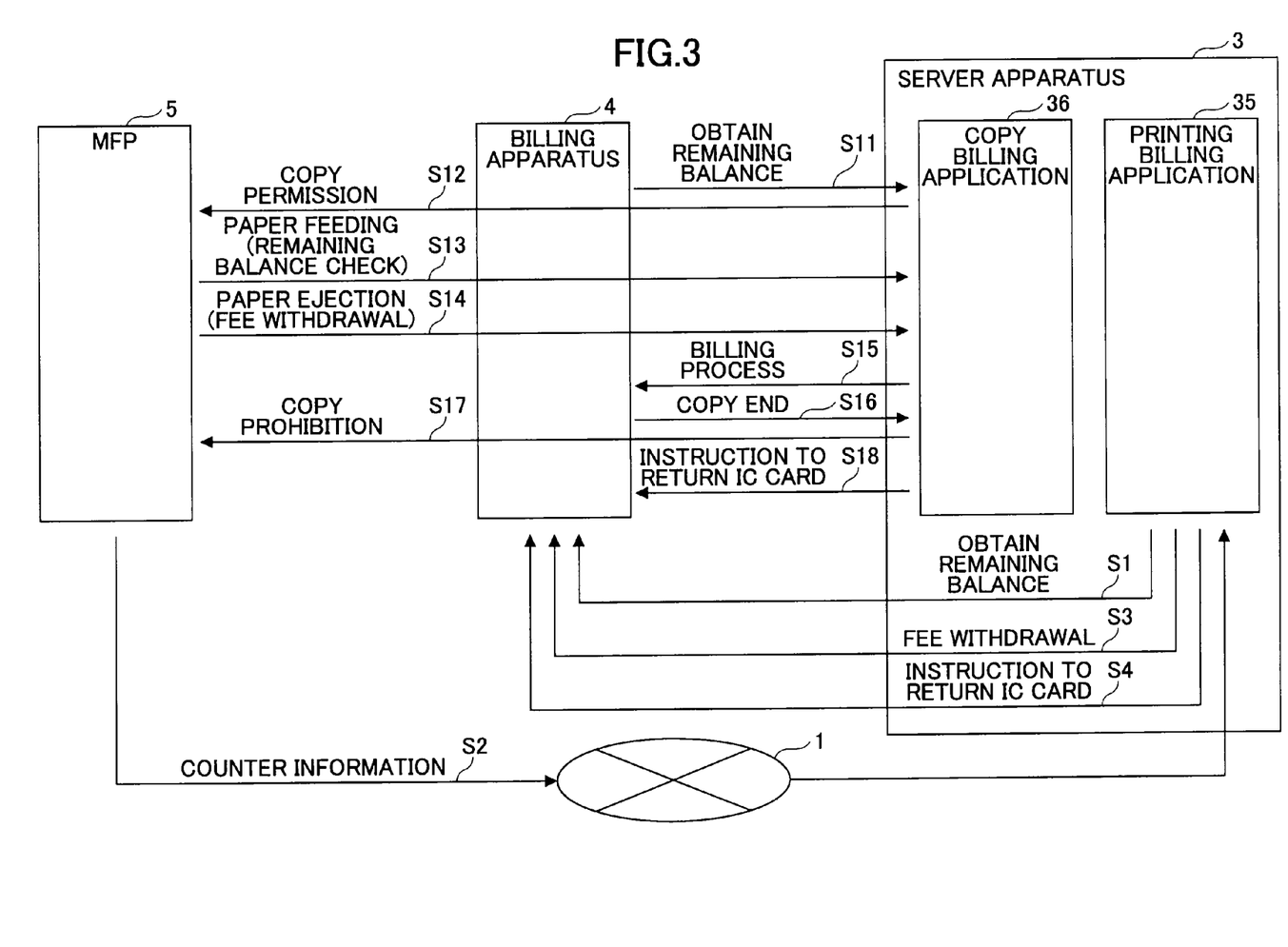
FIG. 3 is a flowchart of a billing process operation performed by a printing billing application and a copy billing application according to the present embodiment.

With reference to FIG. 3, the printing billing application 35 and the copy billing application 36 are described in detail next.

FIG. 3 is a flowchart of a billing process operation performed by the printing billing application 35 and the copy billing application 36.

When the user inserts the IC card into the IC card reader 41 of the billing apparatus 4 and, then, issues a print instruction using the touch panel 31 of the server apparatus 3, the printing billing application 35 is launched and obtains the remaining balance on the IC card (S1). When the user obtains a print output of a desired document from the multi-functional peripheral 5, the counter information of the multi-functional peripheral 5 is transmitted to the printing billing application 35 via the network 1 (S2). When the printing is completed, the printing billing application 35 transmits the billing information to the billing apparatus 4, and issues an instruction of fee withdrawal (S3). Then, the printing billing application 35 issues to the billing apparatus 4 an instruction of returning the IC card (S4), and then ends the process.

On the other hand, if the user inserts the IC card into the IC card reader 41 of the billing apparatus 4 and issues a copy instruction using the touch panel 31 of the server apparatus 3, the copy billing application 36 is launched and obtains the remaining balance on the IC card (S11). After checking the remaining balance, the copy billing application 36 issues a copy permission instruction to the multi-functional peripheral 5 (S12), whereby the user is able to use the copy function of the multi-functional peripheral 5. When the user executes a copy job, the copy billing application 36 obtains the sheet feeding counter information and the sheet ejection counter information from the multi-functional peripheral 5 for each copy action (S13 and S14). The copy billing application 36 obtains the sheet feeding counter information of the multi-functional peripheral 5 in order to check in each sheet feeding action whether the remaining balance on the IC card is sufficient. When the remaining balance is equal to zero, the copy billing application 36 issues a copy prohibiting instruction to the multi-functional peripheral 5 (S17), whereby the user becomes unable to use the copy function. Also, the reason why the copy billing application 36 obtains the sheet ejection counter information of the multi-functional peripheral 5 is to check whether the copy action has indeed been successful. When the copy action has been successful, the copy billing application 36 transmits the billing information to the billing apparatus 4 and instructs the billing apparatus 4 to perform the billing process (S15). If the sheet ejection counter does not count up after the sheet feeding counter has counted up, the copy action is consider to be unsuccessful due to a failure of the multi-functional peripheral 5, and the copy billing application 36 accordingly issues a copy prohibiting instruction to the multi-functional peripheral 5 (S17). If completing all necessary copying jobs, the user issues a copy end instruction from the billing apparatus 4 (S16), and the copy billing application 36 issues a copy prohibiting instruction to the multi-functional peripheral 5 also in this case (S17). Instead of sending the copy end instruction from the billing apparatus 4, the user may input the instruction directly to the server apparatus 3. In this case, the copy billing application 36 directly receives the instruction. After S17, the copy billing application 36 issues to the billing apparatus 4 an instruction of returning the IC card (S18), as in the case of the operation of the printing billing application 35.

Note that the copy permission signal and copy prohibition signal transmitted from the server apparatus 3 to the multi-functional peripheral 5 and the sheet feeding counter signal and sheet ejection counter signal transmitted from the multi-functional peripheral 5 to the server apparatus 3 are transmitted via the billing apparatus 4, and the billing apparatus 4 performs serial/parallel conversion or parallel/serial conversion on each signal at the converting unit 44 before transmitting the signal to its destination.

Next is described a usage application of the billing system having the above-described structure.

Figure 4:
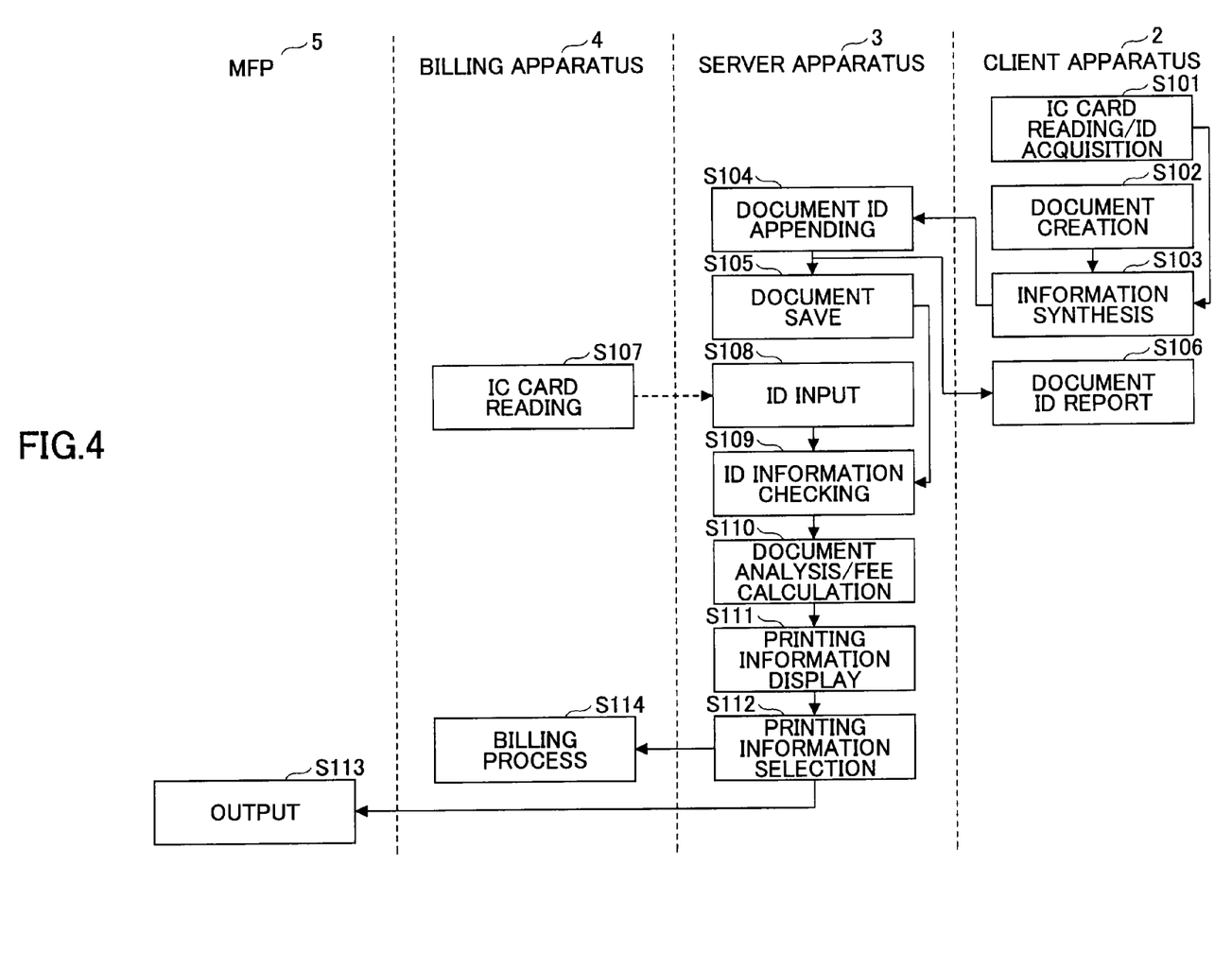
FIG. 4 is a flowchart showing a usage application of the billing system of the present embodiment for a print output.

FIG. 4 is a flowchart showing the usage application of the billing system for a print output.

The user of the billing system first borrows an IC card from an administrator of the system. The system administrator is, for example, a front desk clerk at a hotel. In the IC card, the card ID (user ID) is registered in advance, and money for using the billing system is deposited onto the card when the user makes necessary payments to the administrator. The user moves to the client apparatus 2 with the IC card. The client apparatus 2 may be placed, for example, in the lobby of the hotel. The user causes the client apparatus 2 to read the IC card, whereby the user is authenticated and allowed to use the billing system. By reading the IC card, the client apparatus 2 obtains the card ID of the IC card (S101 in FIG. 4). Subsequently, the user uses the client apparatus 2 to create a document that he/she wants to print (S102). The document may be created directly on the client apparatus 2, or may be read from a recording medium, such as a USB memory, in which the document has been prestored, or may be obtained via a network. Next, when the user issues a print instruction of the selected document, data of the document are transmitted to the server apparatus 3. At this point, the client apparatus 2 appends the obtained card ID to the print data (S103) before transmitting it to the server apparatus 3. The transmitted data may be formed of one piece, or several pieces. When receiving the print data, the server apparatus 3 appends document IDs to the received print data with respect to each document (S104), and stores the print data in the storage unit 32 (S105). That is, if the client apparatus 2 transmits multiple documents, a unique document ID is appended to each document, and each document is stored in the storage unit 32 of the server apparatus 3, in association with the card ID and a corresponding document ID. On the other hand, the server apparatus 3 transmits the document IDs back to the client apparatus 2. Then, on the client apparatus 2 side, the document IDs received from the server apparatus 3 pop up on the display screen, for example, to report the document IDs to the user (S106). The user wanting to print a document makes a note of a corresponding document ID and moves to the server apparatus 3 and the billing apparatus 4.

The user inserts the IC card into the billing apparatus 4. The card ID and the remaining balance information on the card is read by the billing apparatus 4 (S107), and then, transmitted to the server apparatus 3. After receiving the remaining balance information, the printing billing application 35 of the server apparatus 3 checks whether the remaining balance is sufficient for executing a predetermined print output, and subsequently allows printing on the multi-functional peripheral 5.

Figure 5A:
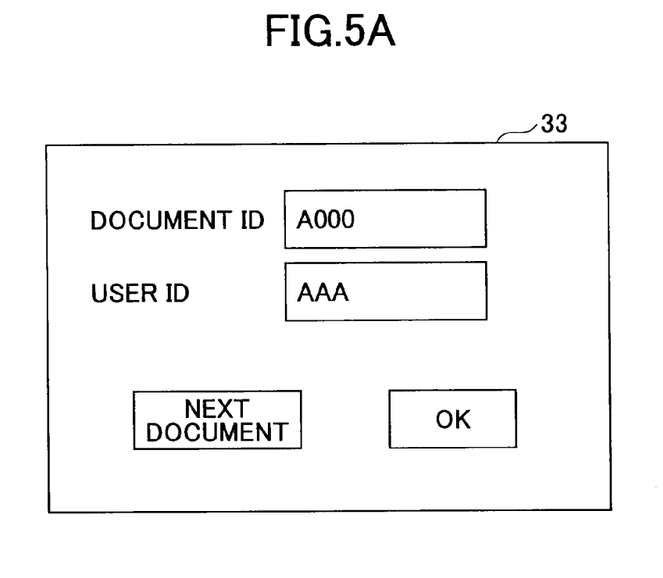
FIGS. 5A and 5B show examples of a display screen of a server apparatus according to the present embodiment, with FIG. 5A being an example of the display screen on which a user inputs a document ID and a user ID and FIG. 5B being an example of the display screen on which documents for printing are presented with necessary fees.
Figure 5B:
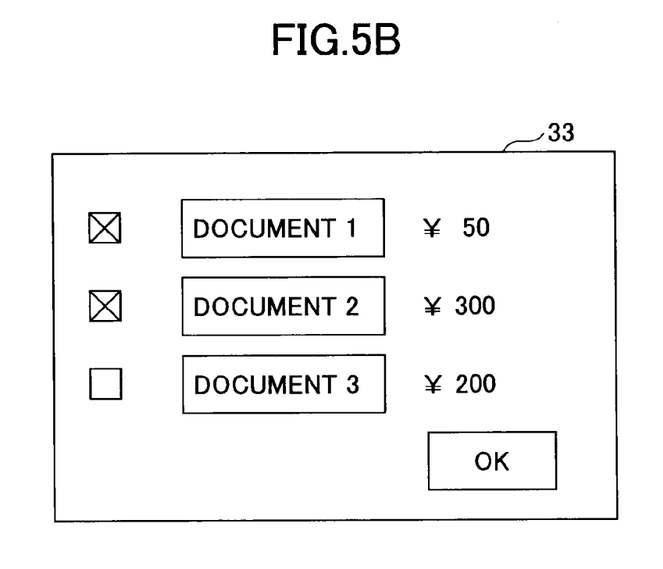

Next, the user inputs the document ID and user ID using the touch panel 31 of the server apparatus 3 (S108). The screen image at this point is shown in FIG. 5A. The user inputs, for example, "A000" in the document ID input field and "AAA" in the user ID input field. If wanting to print multiple documents, the user presses the button of "NEXT DOCUMENT" of FIG. 5A. Then, the format as shown in FIG. 5A is again displayed on the next screen so that the user is allowed to sequentially input documents that he/she wants to print. After the user specifies all documents and presses the "OK" button, the printing billing application 35 checks the user ID and the document IDs against the user ID and document ID appended to each document stored in the storage unit 32 (S109), and makes a display shown in FIG. 5B on the display screen 33 (S111). To make the display, the printing billing application 35 analyzes each target document for printing and calculates a printing fee (S110), and displays all the document names and the fees required to print each document in a list. The way to calculate a fee for each document is as described above. The user specifies documents for printing on the screen of FIG. 5B in such a manner that the total fees for printing do not exceed the remaining balance on the IC card, and presses the "OK" button (S112). In response, document data corresponding to the specified documents are transmitted from the server apparatus 3 to the multi-functional peripheral 5, and the documents are printed out (S113). FIG. 5B illustrates that checkboxes of "DOCUMENT 1" and "DOCUMENT 2" are checked and these two documents are thus specified. The fee information is transmitted from the server apparatus 3 to the billing apparatus 4, and the billing apparatus 4 withdraws the fees from the remaining balance on the IC card (S114).

In the above-described example, the user needs to write down a document ID sent back from the server apparatus 3 in response to transmission of a document from the client apparatus 2 to the server apparatus 3 and then input the document ID into the server apparatus 3; however, without using the document ID, the document may be managed only with the user ID. The following describes this application.

Figure 6:
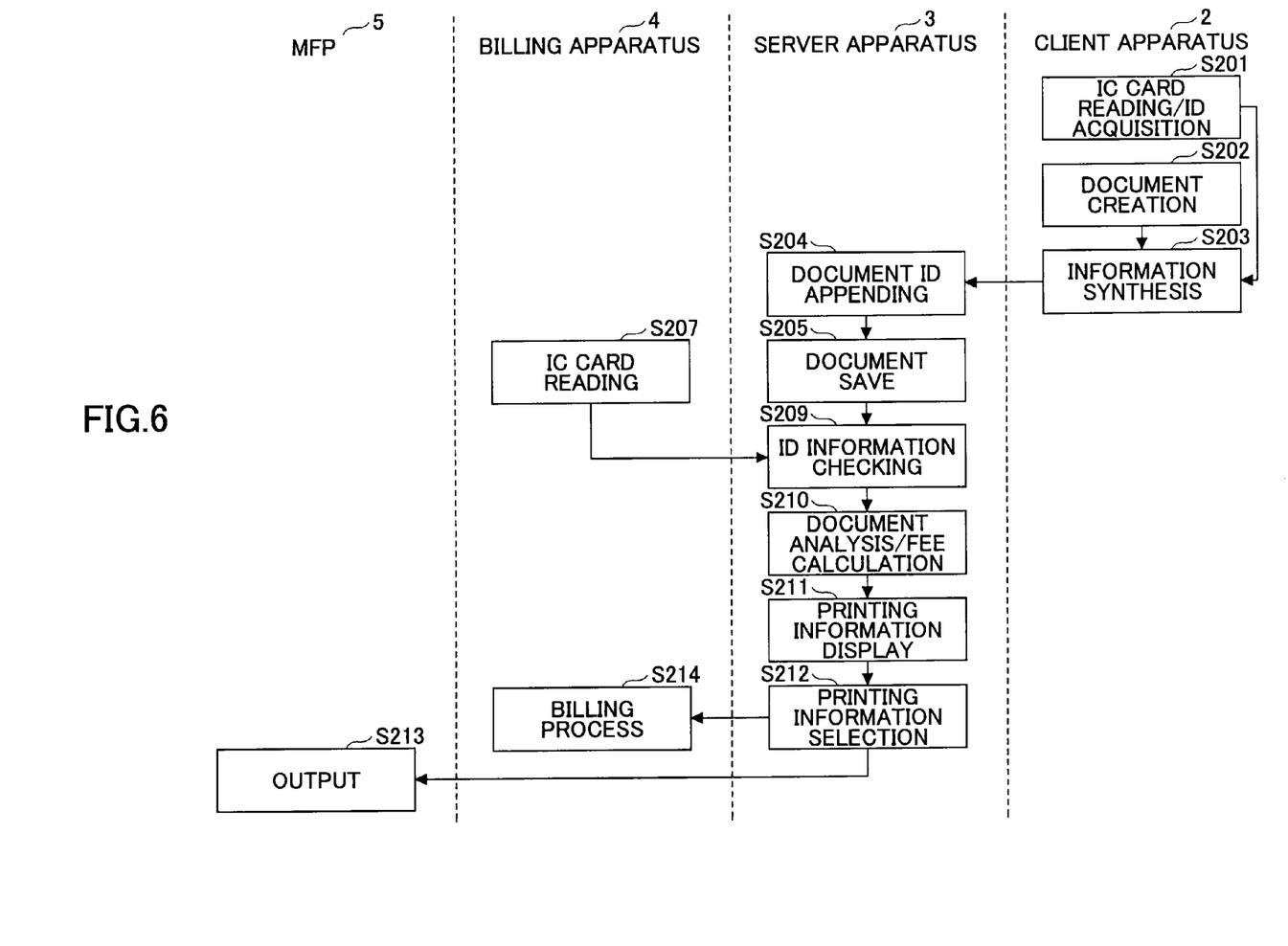
FIG. 6 is a flowchart illustrating another usage application of the billing system of the present embodiment for a print output.

FIG. 6 is a flowchart illustrating another usage application of the billing system for a print output. In FIG. 6, the processes up to S205 are the same as those up to S105 in FIG. 4, and the explanation is therefore omitted.

The example shown in FIG. 6 differs from that of FIG. 4 in that after the server apparatus 3 receives documents to be printed from the client apparatus 2 and appends document IDs to the documents (S204), the server apparatus 3 does not send the document IDs to the client apparatus 2. In this case, after the server apparatus 3 stores the documents to be printed (S205), the user inserts the IC card into the billing apparatus 4 (S207). Then, the billing apparatus 4 reads the user ID and the remaining balance information on the IC card, and transmits the read information to the server apparatus 3. The server apparatus 3 searches, in the documents stored in the storage unit 21, for documents to which the same user ID as one transmitted from the billing apparatus 4 is appended, and then extracts them (S209). After analyzing the documents and calculating the fees (S210), the server apparatus 3 displays the format shown in FIG. 5B on the display screen 33. The user specifies documents for printing on the screen in such a manner that the total fees for printing do not exceed the remaining balance on the IC card, and presses the "OK" button. In response, corresponding documents are printed out from the multi-functional peripheral 5. The processes after S211 are the same as those after S111 of FIG. 4.

As yet another embodiment, the user ID transmitted from the billing apparatus 4 and the document IDs input on the touch panel 31 may be checked against the user ID and document ID associated with each document stored in the storage unit 32, and the checking results may be displayed as shown in FIG. 5B.

Note that the data stored in the server apparatus 3 may be kept until a deletion instruction is received from the user or until a lapse of a predetermined time period, or may be deleted when the printing operation is completed. Also data that were transmitted by the user to the server apparatus 3 but not printed out may be deleted in response to a deletion instruction or after a lapse of a predetermined time period.

Thus, when the print output is completed, the user takes out the IC card from the billing apparatus 4 and returns it to the system administrator. The system administrator checks the IC card and handles a fee settlement process.

In the present embodiment, the user creates a document for a print out using the client apparatus 2. It has, however, recently become common practice for people to carry a mobile PC (personal computer), and the user may want to create a document using his/her own PC. In order to meet such needs, a relay system using a Web server may be used. That is, the user transmits a document from his/her PC to a Web server, and the server apparatus 3 takes out a necessary document from the Web server in response to a print instruction.

This completes the description of the usage application of the billing system for a print out. Next is described a usage application of the billing system for a copy output.

Figure 7:
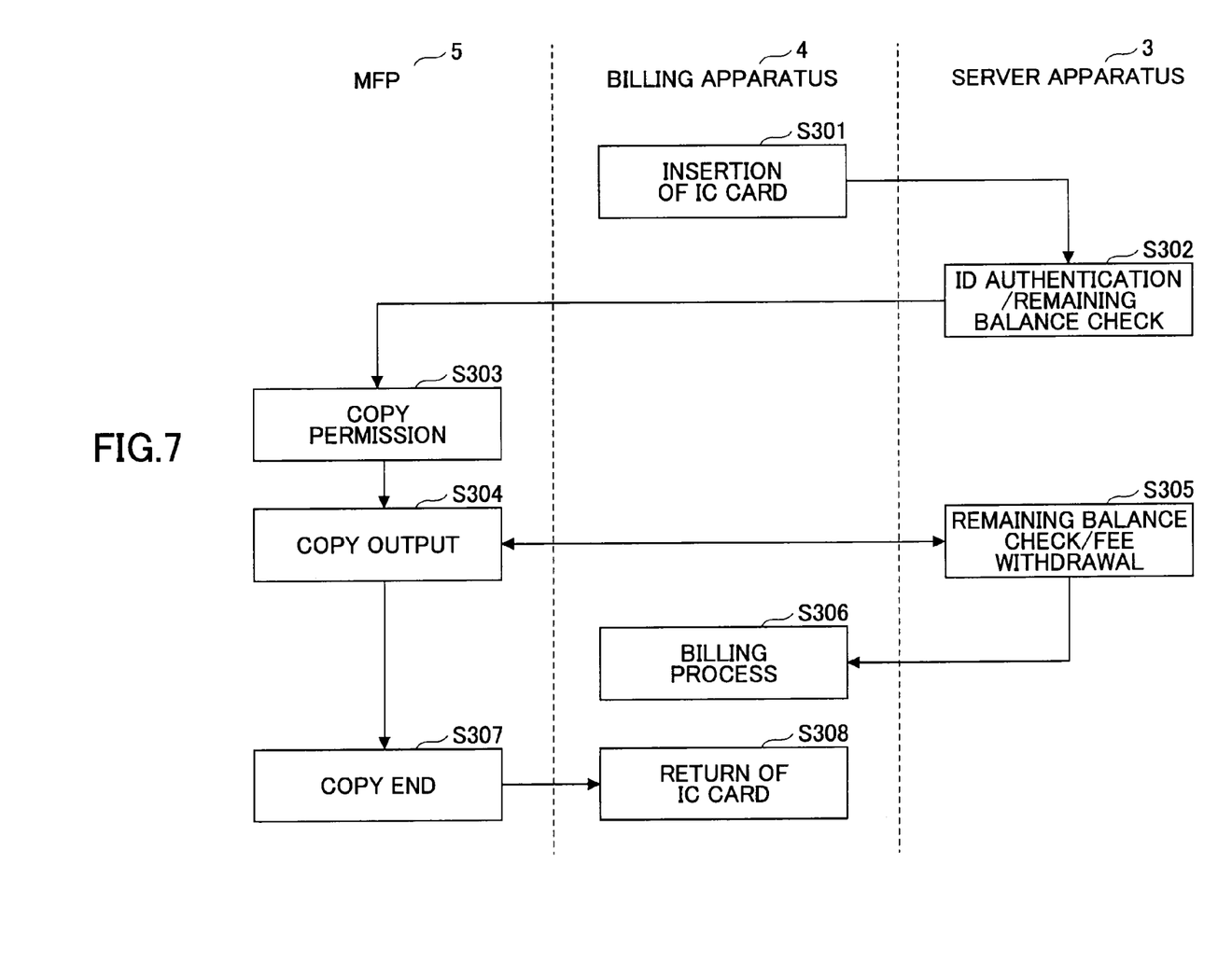
FIG. 7 is a flowchart illustrating a usage application of the billing system of the present embodiment for a copy output.

FIG. 7 is a flowchart illustrating the usage application of the billing system for a copy output.

In the case of a copy output, similar to the case of a print output, the user borrows from the administrator an IC card into which money has been deposited, and inserts the card into the IC card reader 41 of the billing apparatus 4 (S301). Then, as described above referring to FIG. 3, the server apparatus 3 authenticates the IC card using the card ID, and checks the remaining balance on the IC card (S302). The server apparatus 3 issues a copy permission instruction to the multi-functional peripheral 5 (S303), whereby the user is able to use the copy function of the multi-functional peripheral 5. When the user executes a copy job (S304), the server apparatus 3 obtains the sheet feeding counter information from the multi-functional peripheral 5 via the billing apparatus 4 for each copy action, and checks the remaining balance on the card based on the information (S305). The server apparatus 3 also obtains the sheet ejection counter information from the multi-functional peripheral 5 via the billing apparatus 4 for each copy action, and instructs, based on the information, the billing apparatus 4 to withdraw the fee (S305). When receiving the fee withdrawal instruction from the server apparatus 3, the billing apparatus 4 performs the billing process on the IC card (S306). Thus, when the copy output is completed (S307), the user takes out the IC card from the billing apparatus 4 (S308) and returns it to the system administrator.

As described above, according to the billing system of the present embodiment, it is possible to appropriately charge the user based on the result when printing or copying is made on a multi-functional peripheral having a printing function and a copy function. In particular, the converting unit 44 is provided in the billing apparatus 4, whereby a single billing apparatus is capable of effectively handling charging the user for both a print output and a copy output.

This application is based on Japanese Patent Application No. 2008-033447 filed on Feb. 14, 2008, the contents of which are hereby incorporated herein by reference.

What is claimed is:

1. A billing system capable of being connected to an output apparatus having a printing function and a copy function via a network, comprising:
   an input unit configured to read first account balance information of a billing account stored in a storage medium, the billing account being an account from which fee payment for an output performed by the output apparatus is made;
   a billing processing unit configured to update the first account balance information to second account balance information based on print-billing information and copy-billing information;
   a first information processing unit, based on a print instruction, configured to cause the output apparatus to perform a print output of a printing document and generate the print-billing information for the print output based on a print-output signal related to the print output and transmitted from the output apparatus; and
   a second information processing unit, based on a copy instruction, configured to
   check a remaining balance of the storage medium based on the first account balance information,
   issue a copy permission instruction to the output apparatus when the remaining balance is sufficient so as to cause the output apparatus to perform a copy output,
   obtain sheet feeding counter information from the output apparatus for each copy action when the output apparatus performs the copy output, to check whether the remaining balance is sufficient, issue a copy prohibiting instruction to the output apparatus when the remaining balance is equal to zero, so as to cause the output apparatus not to perform the copy output, obtain sheet ejection counter information from the output apparatus for each copy action after a sheet feeding counter has counted up, to check whether the copy action has been successful, issue a copy prohibiting instruction to the output apparatus so as to cause the output apparatus not to perform the copy output when the sheet ejection counter does not count up, and generate the copy-billing information for the copy output based on a copy-output signal related to the copy output and transmitted from the output apparatus when the copy action has been successful.

2. The billing system as claimed in claim 1, further comprising:

a converting unit configured to convert the copy permission instruction from a parallel signal into a serial signal and convert the copy-output signal transmitted by the output apparatus from a serial signal into a parallel signal, wherein the copy permission instruction which has been converted into the serial signal is transmitted to the output apparatus.

3. The billing system as claimed in claim 1, wherein the billing system is comprised of a server apparatus that includes the first information processing unit and the second information processing unit, and a billing apparatus that includes the input unit and the billing processing unit.

4. The billing system as claimed in claim 1, wherein the billing system is comprised of a server apparatus that includes at least the first information unit and the second information processing unit, and a client apparatus provided separately from the server apparatus, the input unit, and the billing processing unit, the server apparatus further includes a storage unit configured to store a printing document, and the client apparatus is configured to read an ID of the storage medium and transmit data of a document with the read ID to the server apparatus when a print instruction of the document is issued by a user, the first information processing unit stores the data of the document in association with the ID in the storage unit as the printing document when the data of the document is transmitted from the client apparatus with the ID, the input unit reads the ID from the storage medium with the first account balance information when the storage medium is inserted, and transmits the ID with the first account balance information to the first information processing unit, and the first information processing unit searches and extracts the data of the document to which the same ID as transmitted from the input unit is appended based on the transmitted ID to display for the user.

5. A server apparatus capable of being connected to an output apparatus having a printing function and a copy function via a network, comprising:

a first information processing unit, based on a print instruction, configured to cause the output apparatus to perform a print output of a printing document and generate print-billing information for the print output based on a print-output signal related to the print output and transmitted from the output apparatus; and a second information processing unit, based on a copy instruction, configured to check a remaining balance of a storage medium based on first account balance information of a billing account stored in the storage medium, issue a copy permission instruction to the output apparatus when a remaining balance is sufficient so as to cause the output apparatus to perform a copy output, obtain sheet feeding counter information from the output apparatus for each copy action when the output apparatus performs the copy output, to check whether the remaining balance is sufficient, issue a copy prohibiting instruction to the output apparatus when the remaining balance is equal to zero, so as to cause the output apparatus not to perform the copy output, obtain sheet ejection counter information from the output apparatus for each copy action after a sheet feeding counter has counted up, in order to check whether the copy action has been successful issue a copy prohibiting instruction to the output apparatus to cause the output apparatus not to perform the copy output when the sheet election counter does not count up, and generate copy-billing information for the copy output by which the first account balance information is updated to a second account balance information, based on a copy-output signal related to the copy output and transmitted from the output apparatus when the copy action has been successful.

6. A method of billing by a system capable of being connected to an output apparatus having a printing function and a copy function via a network, comprising:

reading first account balance information of a billing account stored in a storage medium, the billing account being an account from which fee payment for an output performed by the output apparatus is made;

updating the first account balance information to second account balance information based on print-billing information and copy-billing information;

a first information processing step of, based on a print instruction, causing the output apparatus to perform a print output of a printing document and generating the print-billing information for the print output based on a print-output signal related to the print output and transmitted from the output apparatus; and a second information processing step of, based on a copy instruction, checking a remaining balance of the storage medium based on the first account balance information, issuing a copy permission instruction to the output apparatus when the remaining balance is sufficient so as to cause the output apparatus to perform a copy output, obtaining sheet feeding counter information from the output apparatus for each copy action when the output apparatus performs the copy output, to check whether the remaining balance is sufficient, issuing a copy prohibiting instruction to the output apparatus when the remaining balance is equal to zero, so as to cause the output apparatus not to perform the copy output, obtaining sheet ejection counter information from the output apparatus for each copy action after a sheet feeding counter has counted up, to check whether the copy action has been successful, issuing a copy prohibiting instruction to the output apparatus so as to cause the output apparatus not to perform the copy output when the sheet ejection counter does not count up, and generating the copy-billing information for the copy output based on a copy-output signal related to the copy output and transmitted from the output apparatus when the copy action has been successful.

* * * * *